3,223,259
LOAD HANDLING METHOD AND APPARATUS THEREFOR
Samuel Stevenson Nicholson, River Edge, N.J., assignor to American Can Company, New York, N.Y., a corporation of New Jersey
Continuation of application Ser. No. 232,988, Oct. 25, 1962. This application May 6, 1964, Ser. No. 366,224
7 Claims. (Cl. 214—38)

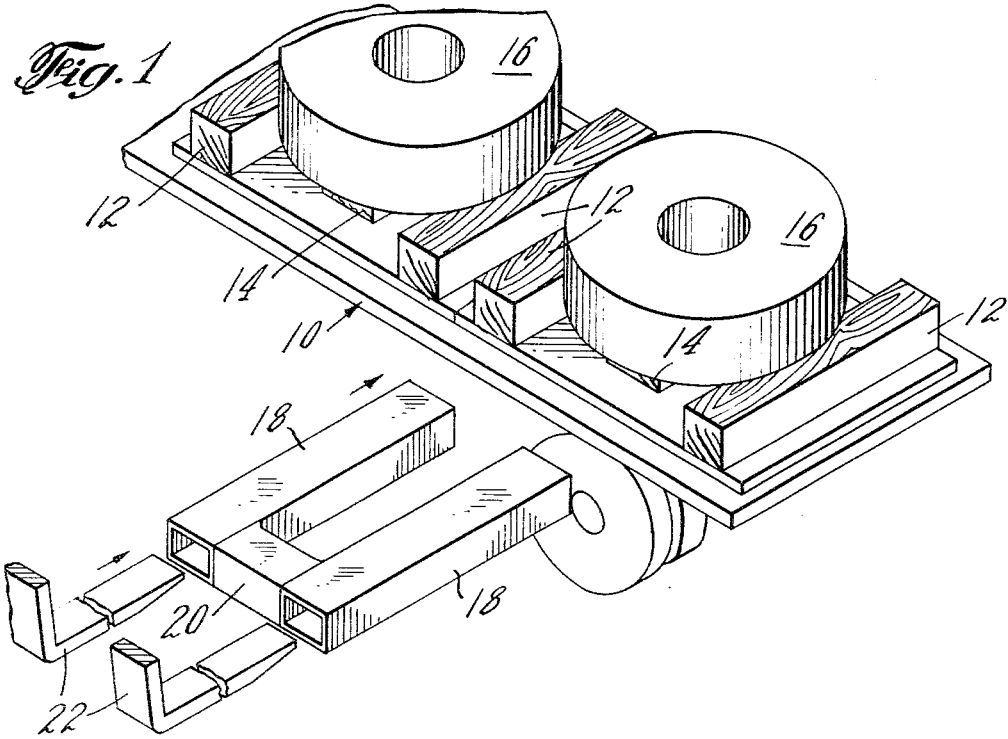
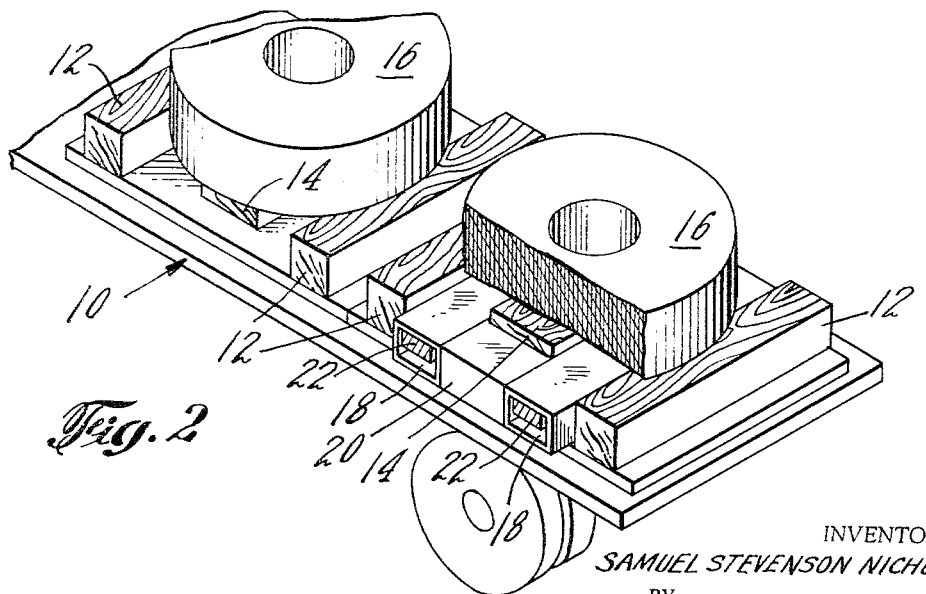
INVENTOR.
SAMUEL STEVENSON NICHOLSON
BY
Frank P. Presta
ATTORNEY Dec. 14, 1965 S. S. NICHOLSON 3,223,259
LOAD HANDLING METHOD AND APPARATUS THEREFOR
Original Filed Oct. 25, 1962 2 Sheets-Sheet 2
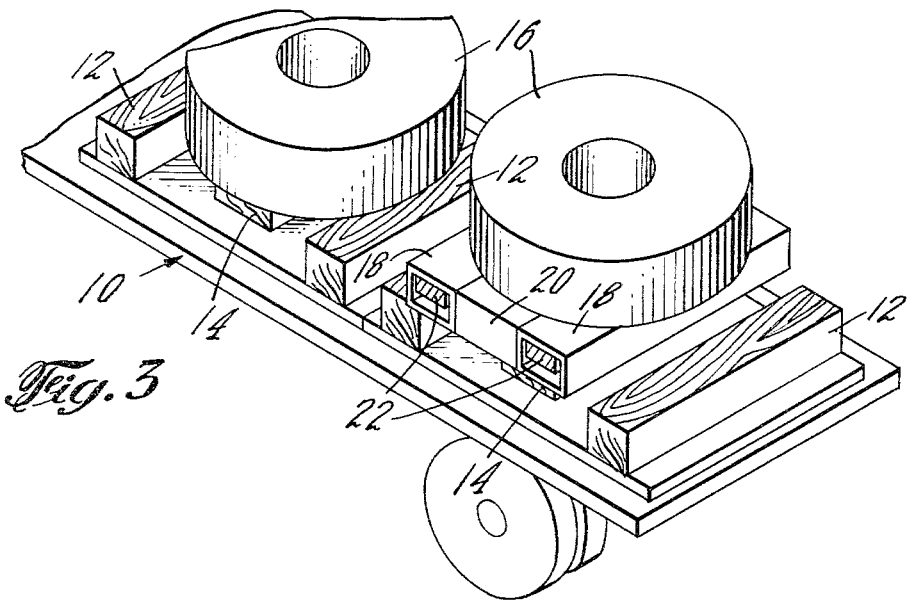
Fig. 3
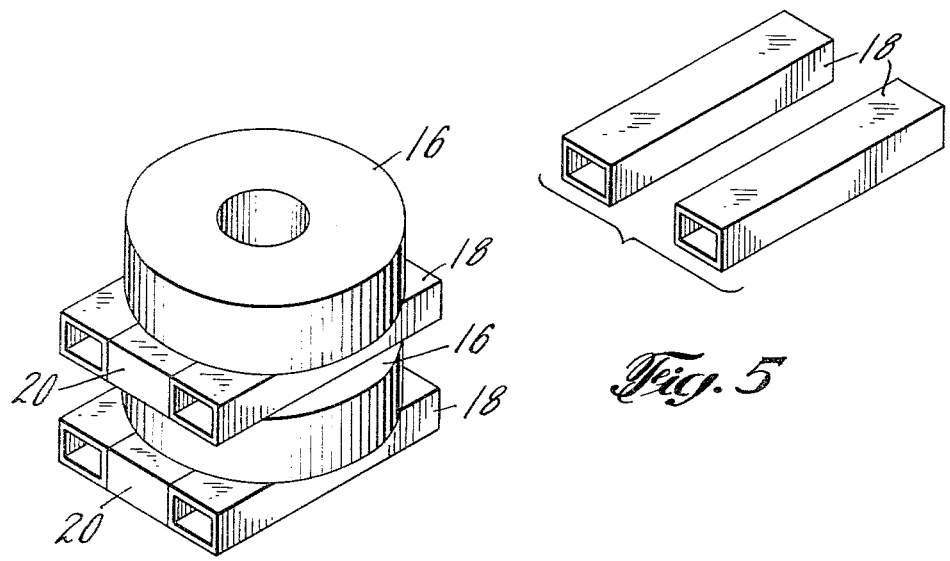
Fig. 4
Fig. 5
INVENTOR.
SAMUEL STEVENSON NICHOLSON
BY
Frank P. Presta
ATTORNEY United States Patent Office 3,223,259
Patented Dec. 14, 1965

This application is a continuation of United States application S.N. 232,988, filed October 25, 1962, and entitled, "Load Handling Method and Apparatus Therefor," now abandoned.

The present invention relates to material handling and more particularly to a method of handling heavy loads such as sheet metal coil stock or the like.

In the handling of coils of the sheet metal stock, it has been the general practice to employ heavy wooden skids or pallets which are placed beneath the coil in the steel mill and which support the coil in transit and in storage until it is positioned in a coil feeding machine at a plant in which it is to be used. Although these wooden skids have served the purpose, they have not proved entirely satisfactory for the reasons that they are expensive to manufacture, purchase and maintain, and some difficulty has been experienced in the handling of these skids owing to their large size and weight.

The general purpose of this invention, therefore, is to provide a method and apparatus for handling sheet metal coils or the like which embraces all the advantages of similarly employed methods and possesses none of the aforedescribed disadvantages. To attain this, the present invention comtemplates a unique method of handling heavy coil stock wherein relatively lightweight and compact hollow sleeves are placed over the forks of a lift truck and are inserted between spaced support members of a delivery vehicle to remove coil stock therefrom. These sleeves remain beneath the coil stock when the forks are removed therefrom and support it in transit or in storage and remain with it until it is used.

An object of the present invention is the provision of a simple and reliable method of handling relatively heavy loads such as sheet metal coil stock.

Another object is the provision of relatively lightweight, compact and inexpensive apparatus for use in such a method.

A further object is to provide a method and apparatus for handling heavy coil stock wherein the stock may be unloaded, stacked or unstacked by a fork lift truck without the use of heavy or bulky pallets or skids.

A still further object is to provide such a method in which relatively lightweight sleeves are placed over the forks of the lift truck and then inserted between spaced supports for the coil stock, whereupon the stock is removed from the spaced supports by the lift truck and brought to a place of deposit where the sleeves remain beneath the coil stock to support it in stacked or unstacked relationship.

Yet another object is to provide a method and apparatus for handling heavy loads whereby the loads may be shipped from place to place without requiring that it be supported during such shipment on the conventional heavy skid which ordinarily must be returned to the place where the shipment originated.

Yet another object of this invention is to provide in such a method lightweight sleeves which are strong, durable and inexpensive to manufacture.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of an apparatus constructed according to the principles of the present invention, the view also showing one of the method steps of the invention wherein the sleeves are about to be placed over the lift forks;

FIG. 2 is a view similar to FIG. 1, showing the forks and sleeves inserted under the coil stock and between spaced supports for the stock, parts being broken away;

FIG. 3 is a view similar to FIG. 2, showing the raising of the lift forks and sleeves to remove the coil stock from the spaced supports;

FIG. 4 is a perspective view showing the coil stock in stacked and spaced relationship with pairs of sleeves therebetween; and FIG. 5 is a perspective view of a modified form of the sleeves shown in FIG. 1.

As a preferred or exemplary embodiment of the invention, FIG. 1 illustrated a delivery vehicle 10, such as a flat bed trailer on a railroad car, which is provided with a supporting surface consisting of a plurality of spaced supports 12, 14 made of wood or another suitable material. Coils 16 of sheet metal stock are supported by the supports, 12, 14 in spaced relation to the floor of the delivery vehicle 10. It is noted that the supports 12, 14 could be permanently attached to the vehicle 10 or could be removable for use on other vehicles or for other purposes.

As shown in FIGS. 1 and 2, sleeves or shoes 18 made of a relatively strong material such as metal are insertable between the support members 12, 14 and under the coil stock 16. The sleeves 18 are maintained in parallel and spaced relationship by a cross member 20 which is rigidly attached thereto, and the supports 14 are of shorter length than the supports 12 to accommodate the cross member 20 and allow the sleeves to be fully inserted between the supports and under the coil stock 16. The hollow portions of the sleeves 18 are of a sufficient size to freely receive fork members 22 of a conventional lift-type truck (not shown). Although the sleeves 18 and hollow portions thereof are shown in the drawings as having a rectangular shape, this shape is, of course, not controlling and could be varied without departing from the spirit of this invention. It would depend on the shape of the lift forks 22, the shape of the openings between the supports 12, 14 and the coil stock 16, and the type of load to be handled. The shape of the hollow portions of the sleeves might even be different from that of the exterior surface of the sleeves in certain situations.

In handling the coil stock 16 by utilizing the steps of the instant method invention, the coil stock 16 is first placed on the spaced supports 12, 14 of the delivery vehicle 10 at a place of origin such as a steel mill in any suitable manner. When the delivery vehicle reaches the plant in which the coil stock is to be used, the sleeves 18 are placed over the forks 22 of a lift-type truck to be used for unloading the coil stock. As shown in FIG. 2, the lift forks 22 and the sleeves 18 thereon are then inserted between the spaced supports 12, 14 and under the coil stock 16, with the cross member 20 adjacent the shorter support 14.

After the forks 22 and sleeves 18 have been inserted under the coil stock 16, the forks are lifted to remove the coil stock from the supports 12, 14, as shown in FIG. 3. The coil stock is then transferred to a place of storage in the plant where the forks are removed from the sleeves and the coil stock is supported by the sleeves until it is to be used. The coil stock may be stored in stacked relationship, as shown in FIG. 4, wherein the coils 16 are vertically stacked with pairs of sleeves 18 therebetween. Thereafter, when it is desired to place the coils 16 in the cradle of a treating machine which will perform some operation on them, such as sheeting, drawing, slitting, coating, etc., the forks 22 are reinserted into the sleeves 18 to facilitate transfer to the coils to the treating machine cradle by the lift truck. The use of these relatively lightweight compact sleeves 18 in the instant method, therefore, provides for convenient unloading, stacking or unstacking of the coil stock prior to its use, without resort to conventional heavy and bulky skids or pallets.

FIG. 5 illustrates a modified form of the invention wherein the cross member 20 rigidly attached to the sleeves 18 has been omitted. In this form, since there is no connection between the sleeves 18, there is no necessity for making the supports 14 shorter than the supports 12, as shown in FIGS. 1–4. Other than this structural change, the coil stock handling method utilizing this modified sleeve arrangement of FIG. 5 will comprise the same steps as the above-described method in which the sleeves with the cross member 20 are used.

It will be readily seen that the principles of the invention are not limited to the apparatus and method disclosed in the drawings and specification, and various other modifications may be made without departing from those principles. For example, various other types of loads other than coil stock could be handled by the instant method and apparatus. Also, it is not necessary that the sleeves be placed on the lift fork prior to their insertion between the spaced supports; the sleeves could first be inserted between the supports by suitable means and then the forks could be inserted within the hollow interiors of the sleeves prior to the lifting step. Furthermore, any suitable means could be used to attach the sleeves in a desired relationship other than the cross member 20, shown in FIGS. 1–4.

It is obvious that the hereinbefore described steps of handling the coil stock may, when necessary, be reversed in order to meet specific load handling requirements. Such a reversal can, for example, advantageously be utilized by a steel mill to store the coils 16 and to place the stored coils 16 on the supports 12, 14 of the delivery vehicle 10. To accomplish this, the coils 16 are placed on the sleeves in the steel mill and the coils and sleeves stored in stacked formation as shown in FIG. 4. Thereafter, when it is desired to load the coils onto the delivery vehicle 10, the lift forks 22 are inserted into the sleeves 18 supporting the topmost coil 16 and the coil 16 and its supporting sleeves 18 are lifted and transported to the delivery vehicle 10, where the forks 22 are lowered between the supports 12, 14 to deposit the coil 16 thereon. The sleeves 18, which are thus relieved of the weight of the coils, are then removed from the vehicle 10 and used to support a new coil, while the coil 16 thus loaded onto the vehicle 10 is shipped to the customer's plant without the sleeves.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for handling a relatively heavy load comprising:
    spaced parallel supports for the load, one of said supports being shorter than the supports on either side thereof,
    a lift-type carrier having a pair of parallel fork members insertable between said spaced supports and under the load disposed on said supports, and
    a U-shaped supporting unit formed by a pair of parallel rigid sleeves and a rigid member cross-connecting said sleeves at one end thereof,
    the upper surface of each of said sleeves and said cross member being disposed in a common plane,
    the maximum vertical dimension of said U-shaped supporting unit being less than the vertical dimension of said parallel supports so that said sleeves are insertable between said parallel supports and under the load disposed thereon,
    said fork members of said lift-type carrier being freely receivable within said sleeves,
    one end of said shorter support being spaced inwardly from the ends of the adjacent supports on either side thereof to accommodate said cross member when said sleeves are inserted between said spaced supports to position said sleeves and said cross member under the load so that said U-shaped supporting unit may be lifted by said lift-type carrier into engagement with the load and said load may be lifted from said spaced supports.

2. Apparatus for handling a relatively heavy load, comprising:
    spaced parallel supports for the load, one of said supports being shorter than the supports on either side thereof,
    a U-shaped supporting unit formed of a pair of parallel rigid sleeves and a rigid member cross-connecting said sleeves at one end thereof,
    the upper surface of each of said sleeves being disposed in a common plane,
    the maximum vertical dimension of said U-shaped supporting unit being less than the vertical dimension of said parallel supports so that said sleeves are insertable between said parallel supports and under the load disposed thereon, and
    a lift-type carrier having a pair of parallel fork members insertable within said sleeves and between said spaced supports,
    one end of said shorter support being spaced inwardly from the ends of the adjacent supports on either side thereof to accommodate said cross member when said sleeves are inserted between said spaced supports to position said sleeves under the load so that said sleeves may be lifted by said lift-type carrier into engagement with the load and said load may be lifted from said spaced supports.

3. The method of handling a relatively heavy load, comprising the steps of:
    supporting the load on spaced parallel supports, one of said supports being shorter than the supports on either side thereof,
    inserting between said spaced supports and under the load disposed thereon the parallel rigid sleeves of a U-shaped supporting unit having a maximum vertical dimension which is less than the vertical dimension of said supports,
    one end of said shorter support being spaced inwardly from the ends of the adjacent supports to accommodate the cross member of said U-shaped supporting unit when said sleeves are inserted under the load,
    lifting said U-shaped supporting unit to bring the upper surface of each of said sleeves into engagement with the load, and
    removing said U-shaped supporting unit with the load on said sleeves thereof from said spaced supports.

4. The method of claim 3 wherein said U-shaped supporting unit is lifted by a lift-type carrier having parallel fork members which are insertable within said sleeves.

5. The method of claim 3 wherein the upper surfaces of said sleeves are disposed in a common plane.

6. The method of handling a relatively heavy load, comprising the steps of:
    placing the load on the parallel rigid sleeves of a U-shaped supporting unit, lifting said U-shaped supporting unit with the load on said sleeves thereof and moving it to a place of deposit, lowering said U-shaped supporting unit to position said sleeves thereof between spaced supports having a vertical dimension greater than the maximum vertical dimension of said sleeves to thereby deposit the load on said spaced supports, one of said spaced supports having one end thereof spaced inwardly from the adjacent ends of the supports on either side thereof to accommodate the cross member of said U-shaped supporting unit when said sleeves are lowered between said supports, and removing said U-shaped supporting unit from said spaced supports to remove said sleeves thereof from beneath the load.

7. A method of handling, transporting and delivering a heavy coil of stock by mobile transportation, comprising the steps of:

mounting a plurality of spaced parallel supports on the floor of a delivery vehicle, one of said supports being shorter than the supports on either side thereof, placing said coil on said supports in spanning relationship thereto, moving said vehicle to deliver said coil to a destination, inserting between said supports and under said load at said destination the parallel sleeves of a rigid U-shaped supporting unit having a maximum vertical dimension which is less than the vertical dimension of said supports, one end of said shorter support being spaced inwardly from the ends of the adjacent supports to accommodate the cross member of said U-shaped supporting unit when said sleeves are inserted under the load, lifting said U-shaped supporting unit and said load by a lift-type carrier having parallel fork members which are insertable in said sleeves, moving said U-shaped supporting unit and said load thereon to a place of deposit, depositing said supporting unit and said load at said place of deposit, and withdrawing said fork members from said sleeves.

References Cited by the Examiner
UNITED STATES PATENTS

| | | | |
|---|---|---|---|
| 946,282 | 1/1910 | Snyder et al. | 198—156 X |
| 2,028,476 | 1/1936 | Rome et al. | 214—16.1 |
| 2,226,294 | 12/1940 | Erickson | 214—38 X |
| 2,361,222 | 10/1944 | McBride | 214—38 X |
| 2,596,478 | 5/1952 | Gerhardt | 214—38 X |
| 2,801,065 | 7/1957 | Moir et al. | 214—10.5 X |
| 2,808,157 | 10/1957 | Terrill | 214—10.5 X |

FOREIGN PATENTS 553,667  12/1956  Italy.

GERALD M. FORLENZA, *Primary Examiner.*

HUGO O. SCHULZ, *Examiner.*